(12) United States Patent
Debenedetti et al.

(10) Patent No.: US 12,155,555 B2
(45) Date of Patent: Nov. 26, 2024

(54) SEGMENT ROUTING NETWORK (71) Applicant: Telefonaktiebolaget LM Ericsson (publ), Stockholm (SE)

(72) Inventors: Paolo Debenedetti, Genoa (IT); Raoul Fiorone, Genoa (IT); Daniele Ceccarelli, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 560 days.

(21) Appl. No.: 17/293,969

(22) PCT Filed: Nov. 19, 2018

(86) PCT No.: PCT/EP2018/081815
§ 371 (c)(1),
(2) Date: May 14, 2021

(87) PCT Pub. No.: WO2020/104012
PCT Pub. Date: May 28, 2020

(65) Prior Publication Data
US 2022/0006723 A1    Jan. 6, 2022

(51) Int. Cl.
*H04L 45/121* (2022.01)
(52) U.S. Cl.
CPC ................. *H04L 45/121* (2013.01)
(58) Field of Classification Search
CPC ..................................... H04L 45/00
See application file for complete search history.

(56) References Cited

U.S. PATENT DOCUMENTS

| 2005/0152397 A1* | 7/2005 | Bai ............... H04N 21/6373 370/395.2 |
| 2016/0294700 A1* | 10/2016 | Kodialam ......... H04L 47/125 |
| 2017/0093732 A1* | 3/2017 | Akhavain Mohammadi ......... H04L 45/74 |
| 2017/0164404 A1* | 6/2017 | Sundararajan ....... H04L 1/0018 |

FOREIGN PATENT DOCUMENTS

WO    2016102008 A1    6/2016

OTHER PUBLICATIONS

Thomas et. al., "Packet expiration time in 6LoWPAN Routing Header draft-lijo-6lo-expiration-time-01", Internet Draft (Year: 2017).*

(Continued)

*Primary Examiner* — Derrick W Ferris
*Assistant Examiner* — Sumitra Ganguly
(74) *Attorney, Agent, or Firm* — Sage Patent Group (57) ABSTRACT

Examples relate to a method of segment routing in a network node (40) of a network comprising a plurality of network nodes (40,42). The method comprises receiving a segment routed packet (60) comprising a payload and having a segment route, and obtaining a target delivery time (106) from the received segment routed packet. The method further comprises determining (108) a time of arrival of the packet at a destination of the packet, and determining (110) if the time of arrival of the packet at the destination is prior to the target delivery time. For a determination that the time of arrival of the packet at the destination is prior to the target delivery time, transmitting (120) a packet comprising the payload towards the destination.

21 Claims, 6 Drawing Sheets

(56) References Cited

OTHER PUBLICATIONS

Thomas, L. et al., "Packet expiration time in 6LoWPAN Routing Header draft-lijo-6lo-expiration-time-01", Internet Draft; Intended status: Standards Track; Expires: Sep. 14, 2017, Mar. 13, 2017, pp. 1-13.

Hui, J. et al., "An IPV6 Routing Header for Source Routes with the Routing Protocol for Low-Power and Lossy Networks (RPL)", Internet Engineering Task Force (IETF); Request for Comments: 6554; Category: Standards Track, Mar. 2012, pp. 1-13.

* cited by examiner

SEGMENT ROUTING NETWORK

TECHNICAL FIELD

Embodiments relate to a method in a node of a segment routing network and a node in a segment routing network.

BACKGROUND

Segment Routing (SR) is an emerging technology which may be used in Multiprotocol Label Switching (MPLS) or Internet Protocol (IP) packet networks and which may be used in both a distributed control plane environment (e.g. an IP/MPLS control plane) and in a centralised control plane environment (e.g. SDN, Software Defined Networking).

Segment Routing, as defined by the Internet Engineering Task Force (IETF), enables enhanced packet routing, offering the ability to provide strict network performance guarantees whilst making more efficient use of network resources and providing greater scalability than other label-switched routing technologies which require a signalling protocol such as Resource Reservation Protocol-Traffic Engineering (RSVP-TE) to preconfigure end-to-end paths for data packets.

Figure 1:
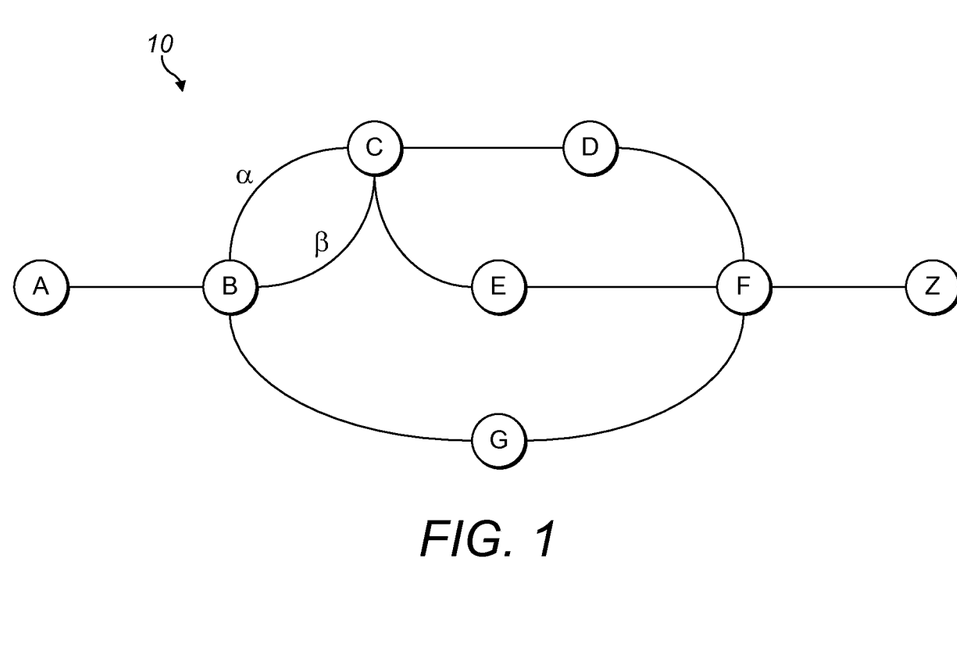
FIG. 1 shows an example network in which segment routing can be performed.

Segment Routing is based on two main concepts: Node Segment and Adjacency Segment. FIG. 1 shows an example network 10 with nodes A-G and Z. Each node in the network 10 is assigned a globally unique Segment Identifier (SID), called a node-SID. When a packet is injected at node A of the network with the segment identifier of node Z, nodes B-G will forward the packet to node Z via a shortest path which has been computed by the nodes at the time node Z was advertised to them. This is an unconstrained shortest path. In other examples, the node-SID is a locally unique identifier. In Adjacency Segment, an adjacency segment identifier, called an Adj-SID, identifies a particular link from a node. In FIG. 1, nodes B and C are connected by links with segment identifiers α and β. The adjacency SID can be a globally unique identifier or a locally unique identifier. If the adjacency SID is globally unique, the adjacency SID alone is enough to identify the link. If the adjacency SID is locally unique, then a combination of a node-SID and adjacency SID is required to identify the link.

A path computation entity (e.g. a PCE or an SDN controller) determines an end-to-end path for data packets across the packet network, and encodes this path as a set of ordered labels. Each label, as explained above, identifies a segment of the path. The set of labels is sent to the ingress network node. Each packet entering the network at ingress node A includes the set of labels in the header of the data packet. The ingress network node reads the outer, or uppermost, label and routes the data packets accordingly over the identified network segment to a further network node. The further network node drops the uppermost label, reads the next label and routes the data packets accordingly over the identified network segment and so on, until the data packets reach the egress network node.

Network traffic may have different and variable latency requirements. Existing prior-art approaches include, for example:

Segment Routing for traffic engineering over IP/MPLS networks using pre-defined segments and source routing mechanisms. Once a path is defined, the relevant segments are set by the source router and processed by each segment router. The packets are steered over different paths taking into consideration their planned bandwidth and priority, but there is no means to control the expected delivery time. The highest priority packets are always routed first on their preferred route, despite their required delivery time. In this way the network is statically dimensioned to ensure that at least the high priority packets arrive within boundaries. As a result, the network is over-dimensioned and the traffic engineering becomes more complex.

Time Sensitive Networking (TSN) is relevant to Ethernet networks where time-sensitive packets have precedence over lower priority traffic by mechanisms of packet pre-emption and prioritization.

DETNET (IETF) Deterministic Networking (DetNet) is a service that can be offered by a network to DetNet flows. DetNet provides these flows extremely low packet loss rates and assured maximum end-to-end delivery latency. This is accomplished by dedicating network resources such as link bandwidth and buffer space to DetNet flows and/or classes of DetNet flows, and by replicating packets along multiple paths. Existing solutions like e.g. DETNET are only concerned about making sure that packets/frames with higher priority and delay constraints reach their destination before the others. This is often done by discarding packets/frames with more relaxed requirements that could be delivered in any case through other paths.

A solution to optimize a network for delivery of data traffic, with consideration of latency requirements, is therefore needed.

SUMMARY

An aspect of the disclosure provides a method of segment routing in a network node of a network comprising a plurality of network nodes. The method comprises receiving a segment routed packet comprising a payload and having a segment route, and obtaining a target delivery time from the received segment routed packet. The method further comprises determining a time of arrival of the packet at a destination of the packet, and determining if the time of arrival of the packet at the destination is prior to the target delivery time. For a determination that the time of arrival of the packet at the destination is prior to the target delivery time, transmitting a packet comprising the payload towards the destination.

A further aspect of the disclosure provides a network node for a network comprising a plurality of network nodes. The network node comprising processing circuitry and a non-transitory machine-readable medium storing code which, when executed by the processing circuitry, causes the network node to receive a segment routed packet comprising a payload and having a segment route and obtain a target delivery time from the received segment routed packet. The network node is configured to determine a time of arrival of the packet at a destination of the packet, and determine if the time of arrival of the packet at the destination is prior to the target delivery time. For a determination that the time of arrival of the packet at the destination is prior to the target delivery time, the node is configured to transmit a packet comprising the payload towards the destination.

A further aspect of the disclosure provides a computer program product comprising a machine-readable medium carrying instructions which, when executed by a processor, cause the processor to perform the method of any example.

BRIEF DESCRIPTION OF THE DRAWINGS

Embodiments of the disclosure will be described, by way of example only, with reference to the accompanying drawings in which.

DETAILED DESCRIPTION

The disclosure relates to extensions to the existing Segment Routing protocols to support latency requirements, for example, for 5G Radio Access Network (RAN) transport and provide mechanisms to route the traffic at each node according to its expected delivery time for each segment. This implements dynamic traffic engineering and provides a mechanism for pro-active congestion avoidance. The disclosure is applicable to Transport optimization in IP/MPLS networks using Segment Routing and SDN (Software Defined Networking).

Aspects of the disclosure incorporates time-sensitive requirements into Segment Routing as a protocol extension, to support routing decisions based on a determined delivery time of each packet compared with their target delivery time. This concept is applied in the context of IP/MPLS and Segment Routing.

In particular aspects of Segment Routing, many routing decisions are taken by the Segment Routing nodes, out of the control of the centralized intelligence (Path Computation Engine —PCE). Thus, it is complex to predict in advance the packet propagation delay within each segment. Aspects of the present disclosure provide a run-time mechanisms and pro-active congestion control to meet the expected delivery time of the packets.

Figure 2:
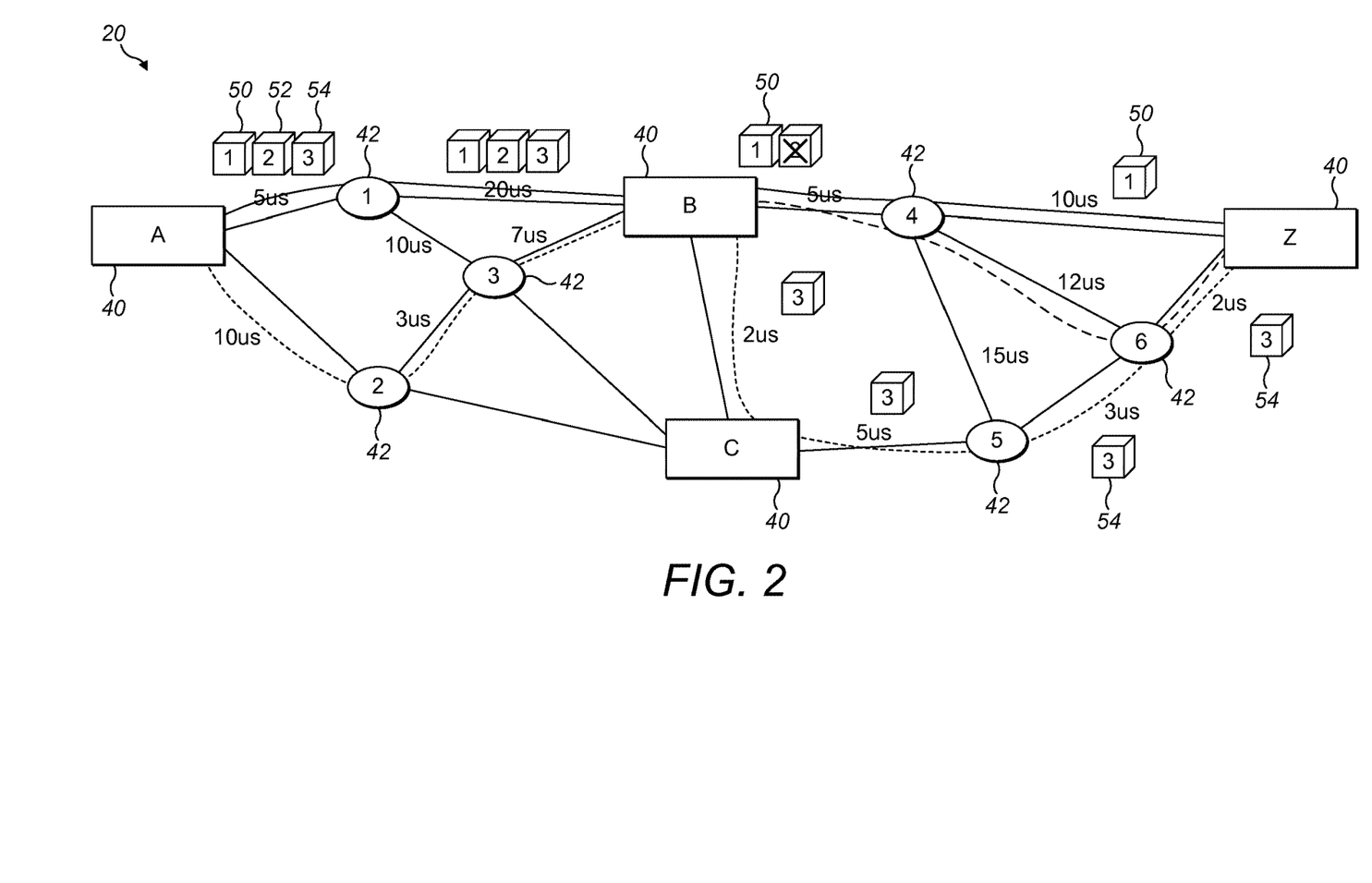
FIG. 2 shows an example network according to an aspect of the present disclosure.

FIG. 2 shows an example of a communication network 20. The network comprises nodes 40, labelled as nodes A, B, C and Z, and also nodes 42, labelled as nodes 1, 2, 3, 4, 5 and 6. The nodes 40,42 comprise packet-forwarding capability. Typically, the nodes 40,42 comprise a router which is capable of receiving a packet 50,52,54 and forwarding a payload of the packet 50,52,54 to another node of the network along links, e.g. optical links, shown as connecting the nodes. The packet may be considered as a segment routed packet. The packet comprises a payload and has a segment route, e.g. packet comprises a header comprising an indication (e.g. identifiers) of the segment route. As described above, the network uses segment routing identifiers (SIDs). A node segment identifier (node-SID) identifies a node 40,42 of the network. An adjacency segment identifier (Adj-SID) identifies an adjacency of the network. The adjacency can be globally unique, or locally unique. A node-SID can be locally unique or globally unique but typically is globally unique by default. The node 40 is configured to carry out segment routing according to the present examples. The node 40 may be considered as a network node in a network comprising a plurality of network nodes 40, 42. The node 40 may be the only node in the network configured to implement the present disclosure, or the network may comprise a plurality of nodes 40 configured to implement the present disclosure.

Each node 40,42 in the network 20 maintains an Information Base by listening to information advertised by other nodes. Nodes advertise their Node-SID and optionally Adj-SIDs using routing protocols. When a new node-SID is advertised, the router receiving it computes a path from itself to the node represented by the node-SID. The computed path may be an unconstrained shortest path, or may be a different path determined using the time information according to the present disclosure.

In some aspects, the network comprises a path computation element (PCE), not shown in FIG. 2. The PCE is a network entity which is capable of computing a path between an ingress node and an egress node of the network. The PCE can receive a path request which defines a source node and a destination node of the path (also referred to as a source and destination), and one or more constraints for the path, such as total delay, bandwidth, path length, e.g. number of hops, or some other constraint. The PCE maintains a database of topology information which it can use to compute paths. The PCE operates in a similar manner to the nodes, receiving topology information which is advertised by nodes using routing protocols. The PCE could reside in one of the nodes of the network. Topology information can be advertised by one or more suitable routing protocols, such as Open Shortest Path First (OSPF), Intermediate System to Intermediate System (ISIS) or Border Gateway Protocol (BGP). In some examples, the network is a SDN network.

In some aspects, the nodes 40,42 in the network 20 are synchronized using any of the protocols available, e.g. NTP. As such, the network nodes 40,42 are considered to be synchronized, and references to time are the same for all of the network nodes 40,42.

In this example, the nodes 40 implement the present disclosure, whereas nodes 42 are "classical" segment routing nodes which do not implement features of the present disclosure. In some aspects, the nodes 40 having processing capability for the present disclosure are not all of the nodes of the network. The nodes 40 may be selected to implement the present disclosure due to being identified as the more critical nodes of the network 20, and/or the nodes with a higher meshing degree, where more meaningful and impacting determinations can be implemented. The node 40 may be an intermediate node, i.e. a node in the route of the packet between the source and destination. In particular, the intermediate node is not the source node or destination. Instead, the intermediate node is a node which handles the packet after the packet has already been transmitted through one or more links of the network, and for which one or more further links will be used to reach its destination.

In this example, nodes 40 A, B and C are equipped with processing capability as described below, while nodes 42, labelled as 1 to 6 are classical segment routing enable routers according to the prior art. This represents also a potential practical advantage, since it is not necessary to provide an entire network of nodes 40 operating according to the present disclosure, but only the deployment of the nodes 40 in key parts of the network. Alternatively, all nodes of the network 20 may be nodes 40 operating in accordance with the present disclosure.

Aspects of the disclosure provide for added extensions in the Segment Routing label stack, also known as SPRING— Source Packet Routing. The extensions may be considered as Delivery Time Extensions (SR-DTE). A node 40 implementing the SR-DTE may be referred to as a SR-DTE enabled node 40. The extensions carry additional information for each packet over the segment routing network, and may also be referred to as header extensions. The disclosure is applicable for IPv6 and SRv6 networks, and also applicable to networks based on IPv4 and IP/MPLS.

Each node 40 is capable to determine if the packet propagation delay between itself and the destination node allows for delivering of the packet by a specified expiration time (i.e. on time) or not. Consequent actions can be taken based on this information, e.g. dropping packets that would not be delivered on time or prioritizing the packets closer to the specified expiration time. The network 20 has routers, i.e. at nodes 40, which are synchronized with each other and/or the SDN controller.

In a network where all the nodes are synchronized, each node 40 (i.e. SR-DTE router) receives packets including the delivery time extension, containing information described below. The node 40 is configured to calculate the expected delivery time to a destination by summing the current propagation time (i.e. delay, or current time) up to that node 40 with the expected future propagation delay of the next segments in the label stack of the packet. In some examples, the expected future propagation delay of the next segments are specified in the packet header, e.g. in header extensions. The node 40 is configured to take an autonomous decision on the routing of the packet through the available segment alternatives. In some scenarios, the node 40 is configured to modify the label stack of the packet to find a better route to the destination, forward the packet according to the current label stack, or discard the packet. In some aspects, the re-routing comprises determining one or more segment labels to identify a new segment routed path for the packet, and modifying a header of the forwarded packet to comprise an indication of the one or more segment label for the new segment routed path. The modifying the label stack may be considered as modifying a header of the forwarded packet to comprise an indication of the one or more segment label for the new segment routed path.

Aspects of the disclosure provide for prioritizing packets which are closer in time to their delivery time expiration, and/or also to find good enough alternative paths that allow delivering on time the packets with more relaxed constraints. In addition, aspects of the described solution provide for dropping (i.e. discarding) packets that, due to issues between the source node and the node 40 processing the packet, would have no viable path to their destination node before they exceed the specified expiration time. The decision to drop, or discard, may be further based on a combination with the packet priority and/or QoS setting.

Each packet according to an example of the present disclosure contains, e.g. in a header, the following time information. For example, time information is added by a source node which is configured to add one or more of the following SR-DTE extensions, which may also be referred to as parameters or labels:

Target Delivery Time (TDT) at destination
Expected Delivery Time (EDT) for each segment
Drop on Late flag (DOL)

Target Delivery Time may also be defined as the specified expiration time or maximum allowed delivery time, i.e. the time at which delivery of the packet to the destination node is required or requested. The Target Delivery Time may be set according to the latency constraints of the required service or application. The TDT is pushed in the SR packet header.

Expected delivery time is the time which is expected to be required for the packet to traverse each segment of the remaining segments to the destination node. As such the expected delivery time for each segment can be used to calculate the further time required for the packet to reach its destination.

In some examples, EDT is defined by the SDN controller based on planned performances of each segment, and corrected by heuristic processing of the actual segment performances (as measured by the nodes). In some aspects, the EDT is periodically updated on the SR-DTE nodes based on measured network performances.

The segments here are according to the standard definition in segment routing. As such, the exact routing within the segment is defined at run-time by the IP/MPLS control plane, and so the exact routing may vary. The variation in routing depends on the segment labels used, i.e. the segment labels may define very short and controlled segments, or may define longer segments with more variation in route allowable and in local control. In some examples, the expected delivery time of a segment is calculated by the SDN controller as an average delivery time of the segment. In some examples, the expected delivery time can be adjusted, e.g. by the SDN controller, heuristically based on live data from the network.

For packets which are routed using segments defining relatively short segments, then it is expected that there will be relatively low variance in the estimated delivery time for each segment. For packets which are routed using relatively long segments, it is expected that the variance in the estimated delivery time for each segment will be relatively high. The present disclosure provides for the nodes 40 to take local decisions about the delivery of segment routed packets. As such, aspects of the present disclosure provide for an effective handling of time critical packets in association with the variation in delivery time related to segment routed packets.

In some aspects, the inclusion of the EDT information in the header packet allows for fast and reliable processing of the packet, i.e. by the node 40 reading the EDT information from the header. The EDT information is the time information known to the source node at the time of transmitting the packet, for the segments planned for the packet. Alternatively, the EDT information may be obtained by the node 40 from another network node, e.g. SDN controller. The inclusion of the EDT information in the packet header provides for more reliability than receiving the information from another network node, e.g. in case of synchronization failure with the other network node (SDN controller).

The Drop on Late flag provides an indication on the drop action to be taken by a node 40 in the event that the packet has, or will, exceed its own Target Delivery Time. As such, the Drop on Late flag determines the node 40 decision on the action when a packet is determined as already late, or that the packet will be late. In some examples, the Drop on Late flag is a Boolean. In some examples, the Drop on Late flag may indicate that the action for a late packet is to be dropped (i.e. discarded), or that a late packet should continue to be forwarded to its destination.

In some aspects, the DOL information is provided to the node 40 by another network node, e.g. SDN controller. The node 40 would have information on each packet flow in advance of forwarding the packet. The inclusion of the DOL information in the packet header provides for a less complex implementation.

The nodes 40 supporting these protocol extensions are referred to as SR-DTE nodes, and use the extensions to determine whether a packet is (or will be) late, and the resultant action to take for the packet. For example, the nodes 40 may compare the TDT with the current delivery time and the EDTs of the next segments in the stack, to determine if the packet will be late.

The labels (i.e. TDT, EDT and DOL) may be encoded in a segment routing header. The time precision level for TDT and EDT may vary depending on the protocol stack used. For SRv6 it is expected to reach up to micro-seconds precision due to dedicated header extensions. For segment routing over IP/MPLS a lower precision up to milli-seconds may be used to limit header size for encoding.

Each SR-DTE node 40 is configured to calculate an Estimated Time of Arrival (ETA) of an incoming packet at its destination node, as described below. The ETA is compared with the TDT label (i.e. specified expiration time) of the incoming packet. For packets for which a determined is made that the packets will not arrive on time at their destination node, the packet can be discarded if discarding is allowed, e.g. by the DOL value. This saves resources and bandwidth in the downstream direction. The discarding is allowed even if the TDT has not yet been reached, i.e. the packet may be discarded because it is determined that the packet will not reach its destination node in time, and not because the TDT has already expired.

In some aspects, the ETA is calculated from a time at which the network node handles the packet, e.g. the time at which the packet is received at the node 40. Alternatively, the time at which the network node handles the packet may, for example, be a current time, or a predicted time of transmission from the network node. The ETA is the time at which the network node handles the packet plus the sum of all further applicable EDT, i.e. the expected delivery times for each remaining segment of the segment route from the node 40 to the destination. Thus, the node 40 is configured to determine the time of arrival (ETA) based on the total of the one or more expected delivery time for each segment from the network node 40 to the destination. The EDT is obtained from an indication in the packet, e.g. from the packet header.

An incoming packet may have a TDT incompatible with the remaining route to the destination node (i.e. determined to reach its destination late) for a number of reasons, for example: network planning, lack of overprovisioning, actual network conditions, faults, activation of protection or re-routing mechanisms, and difference between nominal (i.e. predicted) delays versus actual delays throughout the network.

Based on the comparison between TDT and ETA, each SR-DTE node 40 can decide, at least, to:
Forward the packet over its next Segment as specified in the header stack (i.e. if the packet is determined to be able to reach its destination node in time, or if discarding is not allowed), or
Discard the packet if the specified TDT is not achievable and the DOL is enabled.

In a further aspect, SR-DTE enabled nodes 40 can balance the traffic load among several alternate paths based on the delivery time information, i.e. the Delivery Time Extensions. This allows an improved network utilization and allows the network operator to plan for higher utilization of the network. For example, the network operator can rely on a mechanism that can distribute the traffic based on the real and quantitative requirements of the packets (e.g. 50 μs) rather than on their type or qualitative requirements (e.g. low latency).

Based on the comparison between TDT and ETA, each SR-DTE node 40 can decide, at least, to:
Forward the packet over its next Segment as specified in the header stack (i.e. if the packet is determined to be able to reach its destination node in time, or if discarding is not allowed), or
Discard the packet if the specified TDT is not achievable and the DOL is enabled, or
Re-route the packet over a different segment if this can allow the packet to reach the destination before TDT expiration (resolve congestion). For example, the SR-DTE enabled node 40 selects a route or segment which has a lower (or least) delivery time, based on the EDT information of possible routes. The re-routed packet is able to reach the destination within the TDT, even if the packet would not have reached the destination within the TDT on the originally specified route or the route which would be selected based on other characteristics, e.g. shortest path.
Re-route the packet over a different segment if the packet is still expected to arrive within the TDT (fast enough, but not necessarily the fastest). For example, the node 40 may determine that a route may be slower (based on the EDT information), but will still arrive at the destination node within the TDT. This allows faster routes to retain more available bandwidth to carry packets which need to be delivered to the destination more quickly (based on their TDT).

In some aspects, the re-routing the packet comprises determining a new route to the destination with respect to the original segment label stack. Thus, the node 40 is configured to edit the segment label stack of the packet, i.e. insert and/or remove different segment labels. As such, the segment routing of the packet is changed by the intermediate node. In this case, the intermediate node is performing a path calculation for a new segment route. The new segment route is achieved by inclusion of new segment labels in the packet. EDT information for the new segments may also be included. This local determination of segment routing provides functionality which is not achieved with a centralized SDN controller. The local decisions provide for network optimization and traffic delivery optimization that the SDN controller cannot effectively take.

Alternatively, or in addition, the node 40 is configured to transmit the packet over the same segments, i.e. not changing the segment label stack. In some aspects, the segment does not define a single or exact path for the packet, and so the node 40 carries out a path calculation to implement the segment (which is separate to the re-calculation of the segments). When carrying out the path calculation to implement the segment, the node 40 may be configured to raise or lower a weighting of the possible IP/MPLS paths based on the time information. For example, the path calculation may increase or decrease a priority of the time required for a possible path, depending on whether the determined time information indicates the packet requires a faster path or should accept a lower path. As such, the packet is likely to be delivered faster or slower than the average estimated delivery time for that segment.

In some aspects, the packet contains EDT of its own segments only, i.e. those segments which the packet has been assigned as its route to its destination. The node 40 additionally has information of all segments up to the destination, for example because the node 40 has been provided information of additional segments and their EDT by the SDN controller in advance.

The re-routing by the node 40 is optional, and allows prioritization of other packets closer to their TDT expiration. This reduces the rate of discarded packets due to TDT expiration. The selection of the route may additionally be based on the actual network's utilization, i.e. the node 40 determines the route based on TDT information and current network utilization, e.g. available bandwidth on a route.

In some aspects, the node 40 is configured to re-route the packet by determining a different segment for transmitting the payload based on the determining if the time of arrival of the packet at the destination is prior to the target delivery time, which includes determining if the time of arrival is after the target delivery time.

Thus, the nodes 40 are configured to receive the packet and verify its actual delay up to that point (e.g. by looking at a real time clock). The node 40 determines a sum of the expected propagation delay of the next segments, e.g. by reading the label stack and obtaining the estimated delay time (e.g. EDT) associated with each label of the label stack for the remaining segments to the destination. If the expected time of arrival is acceptable, e.g. before and/or within a threshold of the obtained target delivery time, the node 40 may determine to make no change to the label and the next segments are followed. Alternatively, the node 40 may re-route the packet to improve the overall network, e.g. to deliver that or other packets in time. If the expected time of arrival is outside (i.e. after) the target delivery time or later than a threshold time after the target delivery time, the node 40 is configured to take a further actions, e.g. to modify the label stack to find a different route or discard the packet. The different route may be a faster route, e.g. to allow the packet to reach its destination by the target destination time. Alternatively, the different route may be a slower route, e.g. if the packet is considered not to be able to reach its destination by (or near) the target delivery time, using a slower route for the packet may improve the network by reserving fast routes for packets which might be able to meet their target delivery time.

Segment Routing is a centralized SDN driven mechanism, so it is not necessarily able to react to real-time traffic conditions. The aim of the routing may be to minimize a cost function of the route, for example, propagation delay. With general Segment Routing, there is no association with specifying micro-second precision for packet forwarding since the Segment Routing is simply designed to minimize the cost function itself. With aspects of the present disclosure, using precise delivery times is possible since delivery time is one of the criteria to take a local and real-time forwarding decision. As such, the present disclosure provides for effective handling of data packets according to a delivery time.

In a network according to the present disclosure, a PCE will function as usual for a distributed control plane, e.g. trying to minimize the cost (e.g. delay) for any segment. This is normal operation in a classical IP/MPLS network. The present disclosure may be considered as enhancing the Segment Routing protocols that are used to steer traffic over the (e.g. IP/MPLS) network. Thus, the present disclosure is compatible with existing networks which are not entirely implementing the present disclosure. For example, nodes 42 can be included in the network 20, but are not implementing the time delivery functions of the present disclosure and are not able and not allowed to change the routing of packets at run-time. These functions only need to be carried out by nodes 40 implementing the time delivery functions of the present disclosure.

FIG. 2 shows an example of the network 20 carrying packets 50,52,54, labelled as packets 1, 2 and 3 from a source node A to a destination node Z. Packets 1, 2, 3 may be considered as being example packets of a stream of packets from the same flow, e.g. from the same application. In some aspects, the packets 50,52,54 are considered as having experienced different delays in an earlier part of a network. Alternatively, the described principles also apply considering the packets 50,52,54 as packets from different sources or services.

All packets 1, 2, 3 are routing using segment routing from Node A to Node B, via node 1 only. Node 1 is a legacy node 42, and so does not implement the time delivery extensions described. Node B is a node 40 operating the time delivery extensions described. As such, Node B is configured to extract the information of the time delivery extensions contained in the segment routing headers of the packet, and determines an ETA of each packet as described.

For packets 1 and 3, the ETA is determined to be within (or near) the Target Delivery time, i.e. on time delivery is achievable. Thus, packets 1 and 3 are forwarded according to their segment routing labels. In this example, packet 1 is forwarded to Node Z via node 4, and packet 3 is forwarded to Node Z via Node C, node 5 and node 6.

For packet 2, the ETA is determined to not be within the Target Delivery time, i.e. on time delivery is not achievable. This is the case even if the Target Delivery time has not yet expired. For example, the Node B may calculate the remaining time until the Target Delivery time to be 10 µs, i.e. the difference between the TDT and current time at Node B is 10 µs. The remaining EDTs are shown in FIG. 2. For example, on the route Nodes B-4-Z, the total of the EDTs is 15 µs, i.e. 5 µs (Node B to node 4)+10 µs (node 4 to Node Z). On the route Nodes B-C-5-6-Z, the total EDT is 12 µs, i.e. 2 µs+5 µs+3 µs+2 µs. Other routes are possible, but have longer predicted times to reach the destination node. Thus, it is not possible for the packet 2 to reach Node Z in time, i.e. before the TDT. In the example, the Drop on Late flag is enabled, i.e. set to a value indicating that the packet can be dropped if late. Thus, the Node B discards the packet 2, i.e. does not forward the packet 2.

The above process is applied recursively by each SR-DTE node 40 along the path of the packet up to the destination, each node calculating the ETA to the destination node up to the end point. The precision of the ETA calculation improves along the path since the number of next segment EDTs reduces after each segment.

Figure 3:
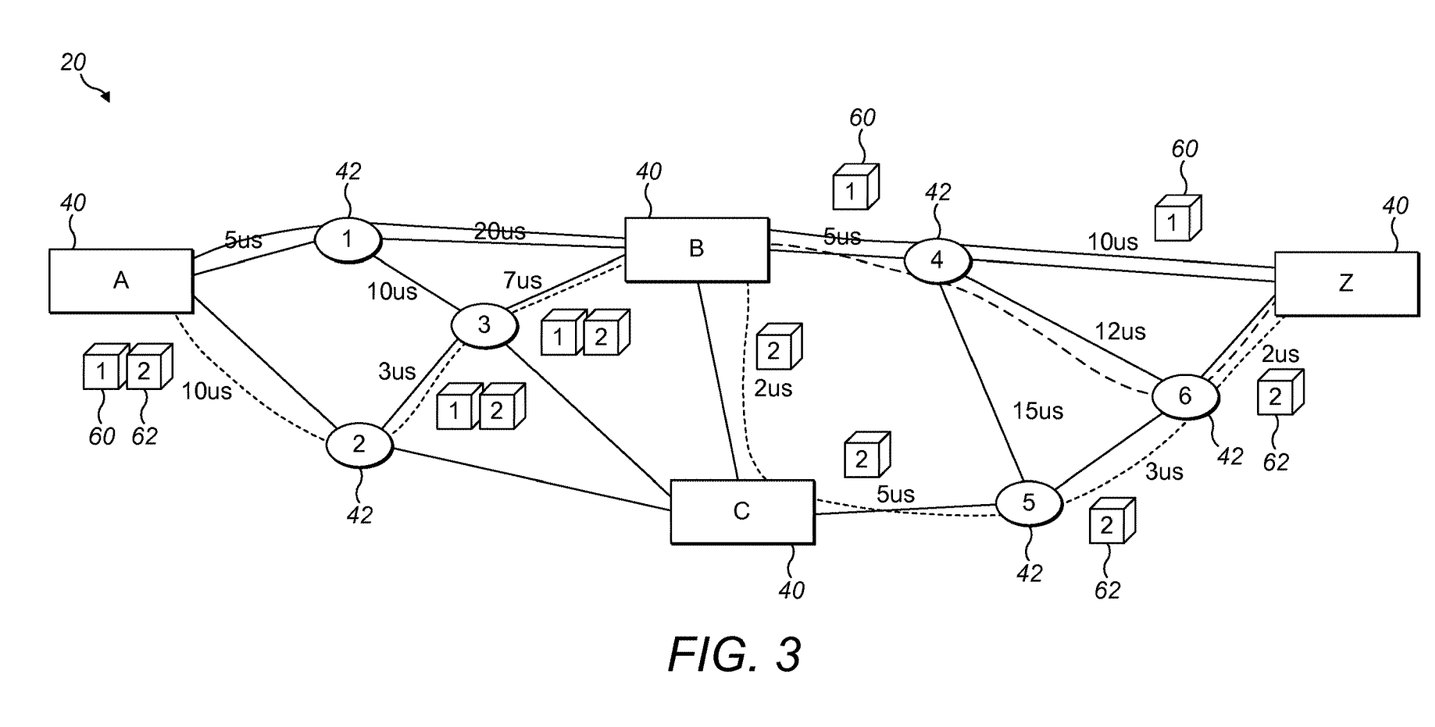
FIG. 3 shows an example network according to a further aspect of the present disclosure.

FIG. 3 shows an example of the network 20 carrying packets 60,62 labelled as packets 1 and 2 from a source node A to a destination node Z. In this example, both packets 1 and 2 are labelled according to the prior art as requiring "low latency" and therefore a high priority treatment. However, the present delivery time information can determine routing according to the actual requirements of the packets, rather than merely based on the general type of service.

In this example, node 40 B determines that that packet "1" 60 can be transmitted to the destination node Z via node 4, with corresponding delay (15 µs), which is compatible with the TDT of packet 1. The node 40 B further determines that packet 2 requires a faster lane to arrive on time at its destination node Z within its TDT. Thus, the node 40 B determines that packet 2 should be sent on a faster route, e.g. via Node C, node 5 and node 6 (total 12 µs). The node 40 B carries out a segment re-calculation, and transmits a packet "2" 62 with a modified label stack to use the faster route.

Thus, a "fast route" is used only when necessary based on the time delivery information in the packet and information about the predicted delivery time of the future segments, and slower routes will be used instead when those routes are sufficient to meet the packet's requirements.

This method therefore introduces a quantitative dimension to the QoS, assigning to each packet its own numerical target and requirement in terms of delivery, rather than a qualitative and relative indication of its importance like in the prior art. The proposed solution allows for an effective network behavior, in the use of both the available resources and dynamic traffic routing decisions.

Figure 4:
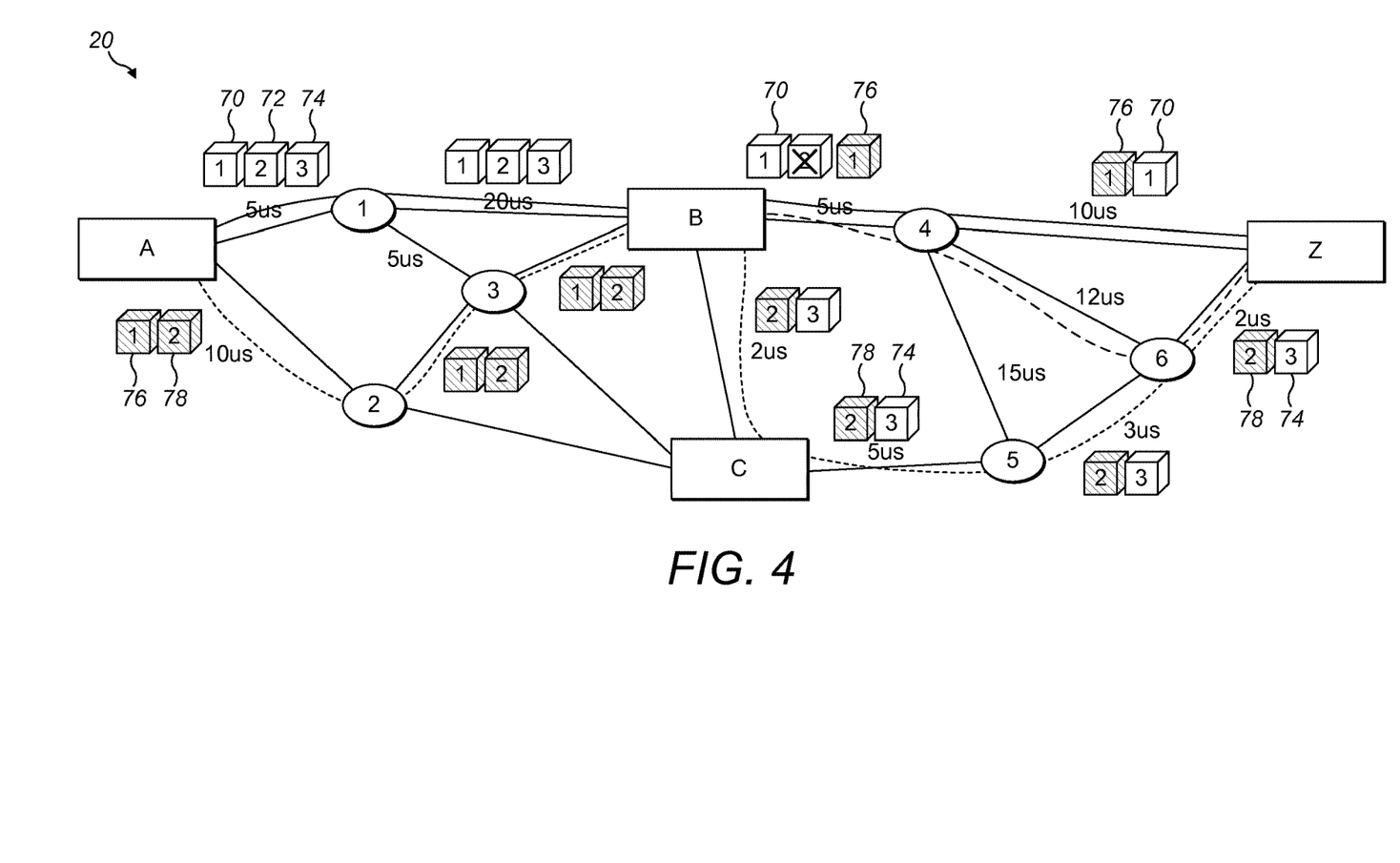
FIG. 4 shows an example network according to a further aspect of the present disclosure.

FIG. 4 shows a further example using the network 20. In this example, node 40 A routes the traffic according to packets' TDT and to the expected further segments delay (EDT). In this example, the network 20 is transporting an "A" set of packets 70,72,74, labelled as packets 1, 2, 3 and a "B" set of packets 76,78 labelled as packets 1,2. In some aspects, the "A" set of packets are from a different flow and/or application than the "B" set of packets.

The "A" set of packets have a more relaxed latency requirement than the "B" set of packets, i.e. the TDT of the "A" set of packets is further in the future (i.e. higher than) then the TDT of the "B" set of packets. The router at node 40 A determines this difference in TDT, and so routes the "A" packets through the network on a slower route (Node A-node 1-Node B) and the "B" packets going through a faster route (Node A-node 2-node 3-node B). The packets labelled as "A" (or "B") do not need to belong to the same traffic class or type, the packets of each set are routed based on their DTE information.

The next DTE enabled node 40, node B, performs a corresponding delivery time analysis on the received traffic and carries out the appropriate actions or routing decisions. In this example, node B drops packet 2 from set "A" because Node B determines that the packet 2 has no chance to reach its destination in time based on the comparison of ETA and TDT described, and DOL is enabled to allow discarding. The Node B takes its own, autonomous, decisions on the traffic to discard and/or route packets based on the time information retrieved from the packets.

In this example, Node B routes "A" packet 1 and "B" packet 1 on the slower route (Node B-node 4-Node Z) and "A" packet 3 and "B" packet 2 onto a faster route, based on the time information, e.g. their actual delay so far, their TDT and the network conditions to destination.

Using the described mechanism, each Source Router 40 assigns a stack of Segment Propagation targets to each packet. Each SR-DTE enabled node takes the appropriate Segment decision based on compliance with, or deviation from, their TDT. For example, the SR-DTE enabled node may discard the packet, forward the packet according to its planned segment routing or determine a new segment routing and/or path calculation, based on the time information (i.e. difference between target delivery time and estimated time of arrival).

A segment routing decision at each SR-DTE enabled node is based on comparison between TDT and the actual packet propagation delay expected, taking into consideration the route of the packet to its destination. The node can therefore decide to drop the packet if its QoS requirements cannot be met by any segment and route to destination, or forward the packet onto a segment which allows the packet to arrive in time (i.e. by the TDT) to its destination. The selected route is not necessarily the faster lane or route.

A packet may also have a pre-planned or preferential segment assigned to it, and this can be selected by the node in the case that the QoS requirements can be met.

Figure 5:
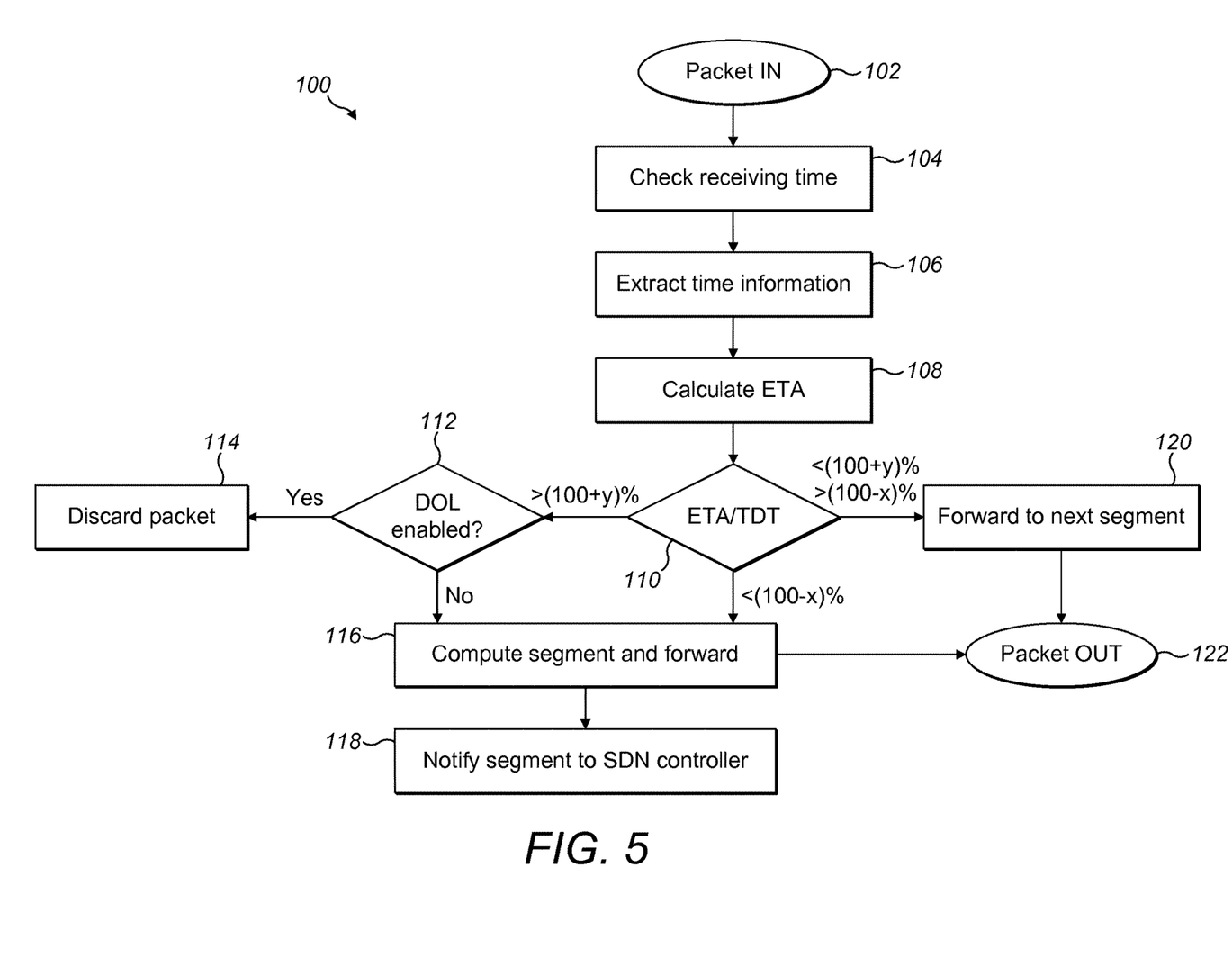
FIG. 5 shows an example method according to an aspect of the present disclosure.

FIG. 5 shows an example method 100 for implementation by a SR-DTE enabled node 40. The method 100 may be carried out autonomously of a PCE.

At 102, the node 40 receives a segment routed packet. At 104, the node 40 determines a receiving time of the packet. The nodes 40 of the network are synchronized, and so the determined receiving time is considered to be on a common time frame with the other nodes 40 of the network.

At 106, the node 40 extracts (i.e. reads) one or more time information parameters from the packet, e.g. from a packet header. For example, the node 40 may extract the TDT. In some examples, the node 40 further extracts the one or more EDT value from the packet and/or the DOL information. As such, the node 40 obtains a target delivery time from the received segment routed packet and/or obtains one or more estimated delivery time from the received segment routed packet. Alternatively, the TDT, EDT and/or DOL may be provided separately to the packet, e.g. from a network control node such as the SDN controller.

At 108, the node 40 calculates (i.e. determines) the estimated time of arrival of the packet at its destination (i.e. ETA). The ETA is calculated as the receiving time of the packet at the node 40 (as determined in 104) plus the sum of all EDTs for the segments to the destination, e.g. as obtained in 106. As such, the ETA is the determined by the node 40 as the current time plus a predicted time for the remaining segments.

At 110, the ETA is compared with the TDT. In some aspects, the comparison is to determine whether the ETA will be after the TDT, in which case the packet is expected to arrive late; or the ETA is prior to (i.e. before) the TDT, in which case the packet is expected to arrive in time). The example shown is for a ratio of ETA/TDT to be compared to 100%, i.e. if ETA>TDT (i.e. the packet is expected to arrive late), the ratio ETA/TDT is greater than 100%. Conversely, if ETA<TDT (i.e. the packet is expected to arrive in time), the ratio EDT/TDT is less than 100%. Alternatively, any method of determining which of the ETA or TDT is later (or earlier) may be used, e.g. a subtraction of ETA and TDT and determining if the result is positive or negative. In some aspects, the node 40 is configured to determine if the time of arrival of the packet at the destination is prior to the target delivery time, which includes determining if the time of arrival is after the target delivery time. As such, the determination is a comparison of the ETA and TDT.

In some aspects, the node 40 may provide for only the above two options, i.e. the packet will or will not arrive in time. In some aspects, the node 40 may further use a tolerance or threshold in the calculation. In 110 as shown, a first threshold of x % on the ratio of ETA/TDT, the first threshold for use when the ratio ETA/TDT<100% (i.e. packet is early). The node 40 may further use a second threshold of y % is on the ratio of ETA/TDT, the second threshold for use when the ratio ETA/TDT>100% (i.e. packet is late). The first and second thresholds x,y may have the same or different values. An example value of the first and second thresholds is 10%. Alternatively, the allowed tolerance may be defined with respect to the planned delivery time per segment, ETA or TDT, for example.

If the result of the comparison in 110 is that the packet will be late (e.g. ETA/TDT>100%), or late by more than the second threshold (e.g. ETA/TDT>(100+y) %). In this case, the method carries out step 112, in which the DOL information is read, obtained and/or used. If the DOL information indicates discarding is allowed, the packet is discarded in 114. No further action for that packet is therefore required, and the packet is not forwarded. If the DOL information indicates that discarding is not allowed, the packet is not discarded. In some aspects, for a determination that the time of arrival of the packet at the destination is after the target delivery time (or after a second threshold y after the target delivery time), the node 40 discards the packet in an example where there is no drop indication included, or determines whether discarding the packet is enabled and discarding the packet if discarding the packet is enabled.

The method proceeds to step 116, in which a segment is computed by the node 40 and the packet forwarded on that segment. Since the packet is considered to be late, and for example, too late to meet the target delivery time, the segment computation may be to determine a slow path for the packet. This allows prioritization of packets with more urgent demands. In some aspects, no computation of a new segment routing is carried out.

In some examples, the result of the comparison in 110 is that the packet will arrive early by more than the tolerance (e.g. ETA/TDT<(100−x) %). Since the packet is considered to be early, the segment computation 116 may be to determine a slow path for the packet. This allows prioritization of packets with more urgent demands. In some aspects, no computation of a new segment routing is carried out. In some aspects, if the determined time of arrival at the destination over the segment route is prior to the target delivery time (e.g. prior to a first threshold x before the target delivery time), the method comprises re-routing the packet over one or more different segments such that the time of arrival of the packet at the destination over the different segment is later than the determined time of arrival, i.e. later than the time of arrival without the re-routing. In some aspects, the time of arrival using the one or more different segments is still prior to the target delivery time. The node 40 forwards the packet on the next segment.

In step 118, the node 40 may further notify the result of the comparison of TDT and ETA to a network control entity (e.g. SDN controller). This allows the network control entity to determine if a large number of packets are arriving too late or too early, and to analyze any cause. This allows the network control entity to take resultant action, e.g. changing the segment routing or changing the provided values of EDT to more accurate values.

In some aspects, the result of the comparison in 110 may be a determination that the packet will arrive at its destination at a time within the tolerance, e.g. ETA/TDT<(100+y) %) and ETA/TDT>(100−x) %). As such, it is calculated the packet will reach its destination a short time (tolerance time) either before or after the TDT.

In this case, the determining if the time of arrival of the packet at the destination is prior to the target delivery time comprises:

determining if the time of arrival of the packet at the destination is prior to the target delivery time by a time within a first threshold (i.e. the packet is "early", but by less than the amount of time of the first threshold), or, determining if the time of arrival of the packet at the destination is after the target delivery time by a time within a second threshold (i.e. the packet is "late", but by less than the amount of time of the second threshold). In some aspects, if either condition is satisfied, a packet is transmitted comprising the payload towards the destination.

In this case, the method proceeds at step 120, in which a packet comprising the payload is transmitted to the next segment. Since the packet is effectively "on-time", no new path computation is required. Transmitting, also referred to as forwarding, a packet which is slightly late (i.e. within the second threshold) without a segment routing re-calculation avoids the need for the processing required for re-calculation. The packet may complete the next segments faster than expected, and so reach its destination within the TDT. Alternatively, a packet which is determined to be "late" by any amount, or by more than a different threshold, may be prioritized by a segment routing re-calculation and/or prioritized in a path calculation within the segment. For example, if the node 40 determines that the time of arrival of the packet at the destination is after the target delivery time by any amount of time, the node 40 may calculate new segments, and re-route the payload using the new segment(s), and/or prioritise the packet in a path calculation within the segment.

At 122, if the packet is not discarded, the node 40 transmits a packet comprising the payload towards the destination, i.e. to the next node 40,42 (or the destination if that is the next node) in the network according to the next segment. The next segment may be a segment that was present in the received packet, or may have been added by the node 40 as a result of a segment routing re-calculation.

A packet may be considered as comprising a header and a payload. The header is considered to comprise routing information for the packet, i.e. segment routing information. The payload comprises data to be transmitted according to the routing information, e.g. user data and/or signaling. References to transmitting or forwarding the packet may refer to transmitting or forwarding the payload of the packet, with the same or a modified header. For example, the packet header may be modified to remove segment information for the completed segment(s). Further changes or modifications may be made to the packet during processing by the node and prior to transmission, as described above. As such, the transmitted packet will in general not be identical to the received packet. Thus, references to forwarding the packet indicate that the payload, e.g. user data or signaling, of the packet will be forwarded. The transmitted packet comprises the payload and, in general, a modified header. Thus, references to forwarding a packet by the network node 40 may be considered as a reference to transmitting a packet by the network node 40, the packet comprising the payload and a header.

In aspects of the present disclosure, each packet is routed according to a "good enough" criterion, based on its actual delay, on the delivery time and the network conditions from each decision point to the packet's destination. This allows an efficient use of the network, which is not based on pre-defined classes or a-priori assumptions, but on the actual requirement of each packet at each SR-DTE enabled node, and based on real propagation data. The network is effectively utilized by allowing dropping of the traffic which has no chance to be delivered according to its requirements, as soon as this becomes evident, i.e. prior to the actual expiration date. This avoids wasting network resources, and also allows upper layers to intervene as early as possible with their mechanisms.

In the present disclosure, segment routing is based on time information, i.e. DTE, e.g. TDT, thus ensuring QoS for the traffic on a quantitative basis. Selection of the segment for routing is based on SR-DTE, resulting in a better use of the segments, and offloading high speed segments when they are not necessary for timely delivery of the packets. This allows better utilization of the network. The present disclosure provides for the possibility to discard the packets that are not able to reach their destination in time, saving network's resources and thus keeping network performance at a high level. In some aspects, the network node 40 discards the packet prior to the target delivery time. As such, there is no further usage of network resources, even though the target delivery time has not yet been reached.

Figure 6:
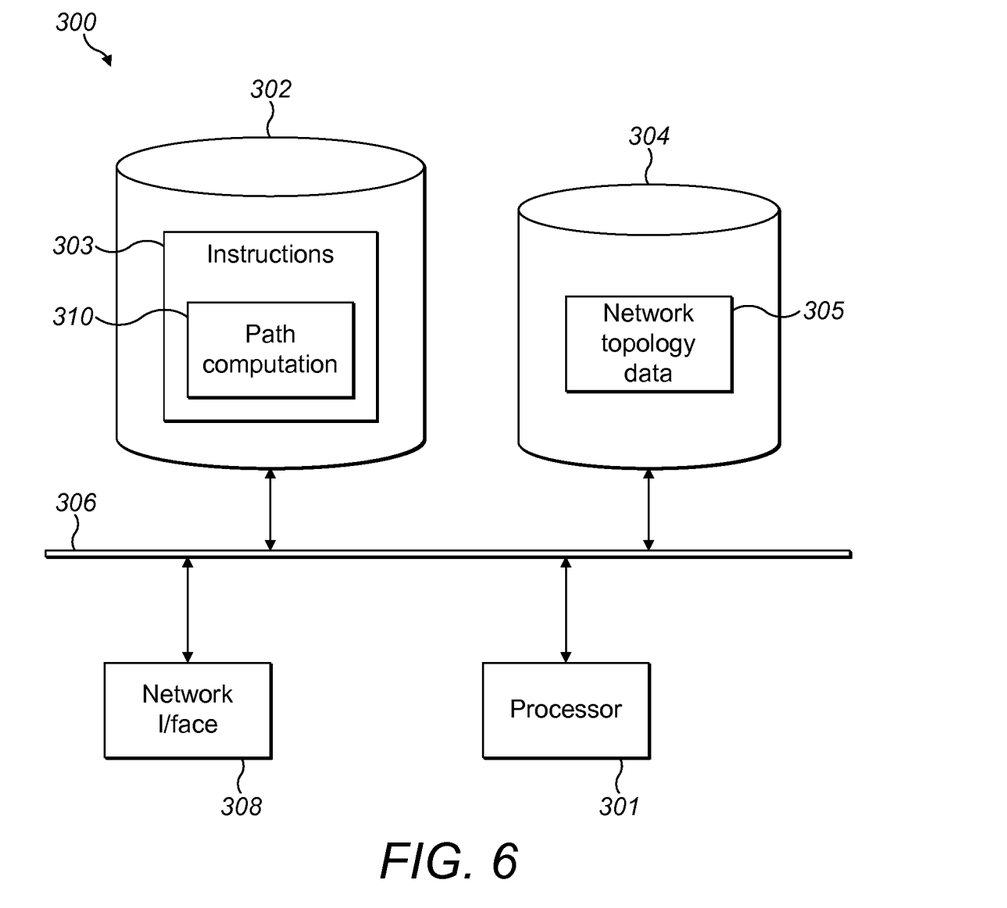
FIG. 6 shows an example network node according to an aspect of the present disclosure.

FIG. 6 shows an exemplary processing apparatus 300 which may be implemented as any form of a computing and/or electronic device, and in which embodiments of the system and methods described above may be implemented. The processing apparatus 300 may be considered as, or part of, the node 40 or a router at the node 40. Processing apparatus 300 can be provided a node 40 forming part of the network. Processing apparatus 300 may implement the method shown in FIG. 5. Processing apparatus 300 comprises one or more processors or processing circuitry 301 which may be microprocessors, controllers or any other suitable type of processors for executing instructions to control the operation of the device. The processor 301 is connected to other components of the device via one or more buses 306. Processor-executable instructions or code 303 may be provided using any computer-readable media, such as memory 302 or a non-transitory machine-readable medium storing code. The processor-executable instructions 303 can comprise instructions for implementing the functionality of the described methods. The memory 302 is of any suitable type such as read-only memory (ROM), random access memory (RAM), a storage device of any type such as a magnetic or optical storage device. Additional memory 304 can be provided to store data 305 used by the processor 301. The code, when executed by the processing circuitry, causes the network node to carry out the functions or method of any example. The processing apparatus 300 comprises one or more network interfaces 308 for interfacing with other network entities. Aspects further include a computer program product comprising a machine-readable medium carrying instructions or code which, when executed by a processor or processing circuitry, cause the processor to perform the method of any example.

Compared to traditional SR-based traffic engineering solutions, the present disclosure provides for a network with more bandwidth available. This is due to the overbooking decisions taken on intermediate SR nodes based on TDT and EDT rather than simple priority-based mechanisms. Aspects of the disclosure provide for pro-active congestion avoidance since each SR router can take independent routing decisions based on TDT and EDT using both local and global criteria. Aspects of the disclosure provide for preventive pre-emption since each SR router can determine, with the DOL flag enabling discarding, to drop (i.e. discard) packets that cannot be meet their TDT requirement. Aspects of the disclosure provide for dynamic traffic engineering, since it is possible to adapt each segment EDT and each packet TDT based on actual network performances.

Aspects of the disclosure are applicable to 5G networks, for example, in time-critical and URLLC networks where delivery time is essential for correct operations of the service and the network itself. Examples of time sensitive data may be remote surgery or sensor synchronization where all the data must arrive in the same time window, although aspects of the disclosure are applicable to any network or data type with time sensitive data.

The present disclosure provides for forwarding/discarding of packets, or segment selection to be based on the actual time available to deliver the packet to its destination. Thus, the actual conditions of the network and the available resources are considered, e.g. a delay earlier in the network. This is in contrast to the prior art, in which packets which belong to a given type of traffic (class and priority) will be always treated in the same way within the network, no matter of the actual conditions of the network and its available resources.

Aspects of the present disclosure provide for a change in the segment routing decision, for example, if there is a high unbalance between traffic types or in case of congestion of one or more routes. The prior art assumes that Quality of Service requirements are met "by network planning", e.g. binding a packet to a path guaranteeing the minimum delay. Aspects of the present disclosure provide a real time check on whether a packet can be actually delivered on time.

Aspects of the present disclosure provide for a determination of delivery time to be performed at any intermediate point in the network, and not merely passively considered passively at application level at the end of the path. Traffic routing is therefore based on network conditions or actual utilization, and not only on the basis of pre-planned parameters.

Aspects of the present disclosure provide for additional functionality to the prior-art behavior of a Segment Routing network with an SDN controller. In a conventional network, segment routing is controlled statically by the SDN controller that enforces packet routing over pre-selected segments based on different parameters like segment cost, segment length and status. Once the routing has been decided, it is statically pushed into the Segment label stack of the packet as per standard Source routing mechanisms. Aspects of the present disclosure provide for dynamic routing, e.g. as determined by an intermediate node.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation. Any example of the method or apparatus may be used in combination with any other example of the method or apparatus.

The invention claimed is:

1. A method of segment routing in a network node of a network that comprises a plurality of network nodes, the method comprising:
   receiving a segment routed packet comprising a payload and having a segment route;
   obtaining a target delivery time from the received segment routed packet;
   determining a time of arrival of the packet at a destination of the packet;
   determining if the time of arrival of the packet at the destination is prior to the target delivery time; and
   transmitting, in response to determining that the time of arrival of the packet at the destination is prior to the target delivery time, a packet comprising the payload towards the destination,
   wherein determining the time of arrival of the packet at the destination comprises obtaining an expected delivery time for each segment of the segment route from the network node to the destination,
   wherein the time of arrival is based on a total of the one or more expected delivery times for each segment from the network node to the destination, and
   wherein obtaining the expected delivery time for each segment of the segment route from the network node to the destination comprises obtaining an indication from the packet of the expected delivery time for each segment of the segment route from the network node to the destination.

2. The method of claim 1, further comprising:
   determining a time associated with the handling of the packet in the network node wherein the time of arrival of the packet is based on the time associated with the handling of the packet in the network node and the total of the one or more expected delivery times for each segment of the segment route from the network node to the destination.

3. The method of claim 1, further comprising:
re-routing the packet by determining a different segment for transmitting the payload in response to determining that the time of arrival of the packet at the destination is prior to the target delivery time.

4. The method of claim 3, wherein re-routing the packet comprises:
determining one or more segment labels to identify a new segment routed path for the packet; and
modifying a header of the forwarded packet to include an indication of the one or more segment labels for the new segment routed path.

5. The method of claim 1, further comprising:
re-routing the payload over a different segment in response to determining that the time of arrival of the packet at the destination is after the target delivery time.

6. The method of claim 1, further comprising:
in response to determining that the time of arrival of the packet at the destination over the segment route is prior to the target delivery time, re-routing the payload over a different segment such that the time of arrival of the payload at the destination over the different segment is later than the determined time of arrival.

7. The method of claim 1, further comprising:
in response to determining that the time of arrival of the packet at the destination is after the target delivery time, discarding the packet or determining whether discarding the packet is enabled.

8. The method of claim 7, wherein determining whether discarding the packet is enabled comprises obtaining discard information from the packet indicating whether discarding the packet is enabled.

9. The method of claim 1, further comprising:
responsive to determining if the time of arrival of the packet at the destination is prior to the target delivery time, determining that the time of arrival of the packet at the destination is prior to the target delivery time by a time within a first threshold, and forwarding the payload towards the destination; or
determining that the time of arrival of the packet at the destination is after the target delivery time by a time within a second threshold, and forwarding the payload towards the destination.

10. The method of claim 1, wherein the network is a SDN network and the network node is connected to a SDN controller.

11. A network node for a network that comprises a plurality of network nodes, the method comprising:
processing circuitry;
memory coupled to the processing circuitry and including instructions therein that are executable by the processing circuitry to cause the network node to perform operations comprising:
receiving a segment routed packet comprising a payload and having a segment route;
obtaining a target delivery time from the received segment routed packet;
determining a time of arrival of the packet at a destination of the packet;
determine if the time of arrival of the packet at the destination is prior to the target delivery time, and
transmitting in response to determining that the time of arrival of the packet at the destination is prior to the target delivery time, a packet comprising the payload towards the destination,
wherein determining the time of arrival of the packet at the destination by obtaining an expected delivery time for each segment of the segment route from the network node to the destination,
wherein the time of arrival is based on the total of the one or more expected delivery times for each segment from the network node to the destination, and
wherein obtaining the expected delivery time for each segment of the segment route from the network node to the destination by obtaining an indication from the packet of the expected delivery time for each segment of the segment route from the network node to the destination.

12. The network node of claim 11, the operations further comprising:
determining a time associated with the handling of the packet in the network node; and
determining the time of arrival based on the time associated with the handling of the packet in the network node and the total of the one or more expected delivery time for each segment of the segment route from the network node to the destination.

13. The network node of claim 11, the operations further comprising:
determining a different segment for transmitting the payload in response to determining that the time of arrival of the packet at the destination is prior to the target delivery time; or
re-routing the payload over a different segment in response to determining that the time of arrival of the packet at the destination is after the target delivery time.

14. The network node of claim 13, the operations further comprising:
determining one or more segment labels to identify a new segment routed path for the packet; and
modifying a header of the forwarded packet to include an indication of the one or more segment labels for the new segment routed path.

15. The network node of claim 11, the operations further comprising:
re-routing in response to determining that the time of arrival of the packet at the destination over the segment route is prior to the target delivery time, the payload over a different segment such that the time of arrival of the payload at the destination over the different segment is later than the determined time of arrival.

16. The network node of claim 11, the operations further comprising:
in response to determining that the time of arrival of the packet at the destination is after the target delivery time, discarding the packet or determining whether discarding the packet is enabled.

17. The network node of claim 11, the operations further comprising:
in response to determining that the time of arrival of the packet at the destination is prior to the target delivery time:
determining that the time of arrival of the packet at the destination is prior to the target delivery time by a time within a first threshold, and forward the payload towards the destination; or determining that the time of arrival of the packet at the destination is after the target delivery time by a time within a second threshold, and forward the payload towards the destination.

18. The network node of claim 11, wherein the network node is an intermediate node between a source of the packet and the destination of the packet.

19. A non-transitory computer readable medium having instructions stored therein that are executable by processing circuitry of a network node in a network to perform operations comprising:
- receiving a segment routed packet comprising a payload and having a segment route;
- obtaining a target delivery time from the received segment routed packet;
- determining a time of arrival of the packet at a destination of the packet by obtaining an indication from the packet of the expected delivery time for each segment of the segment route from the network node to the destination, the time of arrival being based on a total of the one or more expected delivery times for each segment from the network node to the destination;
- determining if the time of arrival of the packet at the destination is prior to the target delivery time; and
- transmitting, in response to determining that the time of arrival of the packet at the destination is prior to the target delivery time, a packet comprising the payload towards the destination.

20. The non-transitory computer readable medium of claim 19, the operations further comprising:
- determining a time associated with the handling of the packet in the network node; and
- determining the time of arrival based on the time associated with the handling of the packet in the network node and the total of the one or more expected delivery time for each segment of the segment route from the network node to the destination.

21. The non-transitory computer readable medium of claim 19, the operations further comprising:
- determining a different segment for transmitting the payload in response to determining that the time of arrival of the packet at the destination is prior to the target delivery time; or
- re-routing the payload over a different segment in response to determining that the time of arrival of the packet at the destination is after the target delivery time.

* * * * *